United States Patent [19]
Johnson
[11] 4,197,404
[45] Apr. 8, 1980

[54] PREPARATION OF γ-QUINACRIDONE PIGMENT

[75] Inventor: Roger A. Johnson, Wilmington, Del.
[73] Assignee: E. I. Du Pont de Nemours and Company, Wilmington, Del.

[21] Appl. No.: 903,948
[22] Filed: May 8, 1978
[51] Int. Cl.[2] .......... C09B 48/00
[52] U.S. Cl. .......... 546/49; 106/288 Q
[58] Field of Search .......... 260/279 QA; 106/288 Q; 546/49

[56] References Cited
U.S. PATENT DOCUMENTS
3,007,930 11/1961 Manger et al. .......... 260/279 QA
3,275,637 9/1966 West .......... 260/279 QA
3,738,988 6/1973 Jackson .......... 260/279 QA

*Primary Examiner*—Alton D. Rollins
*Assistant Examiner*—Diana G. Rivers

[57] ABSTRACT

In a process for preparing pigmentary γ-quinacridone by oxidizing β-dihydroquinacridone with a mild alkali-stable oxidizing agent in a liquid medium consisting of alkali metal hydroxide, water and a polar, alkali-stable, water-soluble organic liquid, this invention provides for an improvement wherein the oxidation is conducted in the presence of 0.1% to 1% by weight of an o-carboxybenzamidomethyl quinacridone compound whereby the resulting γ-quinacridone exhibits sufficiently high strength so that milling or solvent treatments to increase pigment strength are unnecessary.

4 Claims, No Drawings

PREPARATION OF γ-QUINACRIDONE PIGMENT

DESCRIPTION

Technical Field

This invention relates to the preparation of γ-quinacridone, and more particularly, to the preparation of γ-quinacridone in a high strength pigmentary form directly from the oxidation of β-dihydroquinacridone without the need for additional processing steps, for example, milling or solvent treatments.

Background Art

Quinacridone pigments, substituted and unsubstituted, are commonly prepared by the oxidation of the corresponding dihydroquinacridones. Unsubstituted pigmentary quinacridone is known to exist in three separate crystal phases designated as α, β, and γ, each having a distinct color and pigmentary properties. Crude unsubstituted quinacridone can be converted to the desired phase by a variety of treatments, among which are milling and contact with certain phase-directing organic compounds. To avoid the need to convert crude quinacridone to a particular phase after the oxidation of dihydroquinacridone, it has been found that quinacridone can be prepared in the desired phase by oxidizing the proper form or phase of dihydroquinacridone.

A common method for producing pigmentary quinacridone in the γ-phase is described in U.S. Pat. No. 3,007,930. According to this teaching, γ-quinacridone can be produced by oxidizing β-dihydroquinacridone using a mild oxidizing agent in an aqueous alkaline medium containing a polar solvent. Although this method produces a γ-quinacridone which is suitable for a variety of pigmentary applications, the increasingly exacting demands of the pigment industry, particularly with respect to strength of the pigment, often require that the γ-quinacridone pigment resulting from this synthesis undergo further processing steps to develop sufficiently high strength for many applications. Many of the additional steps involve extended milling of the γ-quinacridone or contact with organic solvent to achieve high strength in the final γ-quinacridone. All the additional processing steps contribute to increased cost of the final pigment either from the standpoint of the additional processing time, added materials cost or waste disposal expenses.

DISCLOSURE OF THE INVENTION

This invention provides for an improvement in the process for preparing pigmentary γ-quinacridone by oxidizing β-dihydroquinacridone with a mild alkalistable oxidizing agent in a liquid medium consisting of alkali metal hydroxide, water and a polar, alkalistable, water-soluble organic liquid, wherein the γ-quinacridone can be synthesized directly in a high strength small particle size form without further processing steps, e.g., milling or organic solvent treatment. The improvement resides in conducting the oxidation in the presence of from 0.1% to 1% by weight, based on the weight of the β-dihydroquinacridone, of an o-carboxybenzamidomethyl quinacridone compound characterized by the formula:

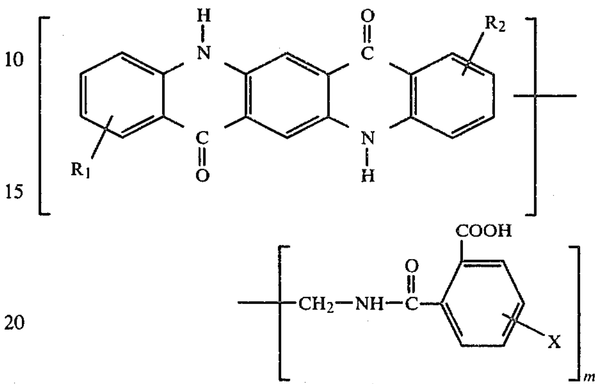

wherein the o-carboxybenzamidomethyl groups are substituted for aromatic hydrogen on the terminal rings, m is an integer of from 1 to 4, inclusive, $R_1$ and $R_2$ are selected from the group consisting of hydrogen, chlorine, fluorine, bromine, methyl and methoxy and X is selected from the group consisting of hydrogen, fluorine, chlorine, bromine, methyl and methoxy.

The o-carboxybenzamidomethyl quinacridone compounds characterized by the above formula may also exist wholly or partially in the form of the corresponding 2-phthalimidomethyl quinacridone compounds represented by the following formula:

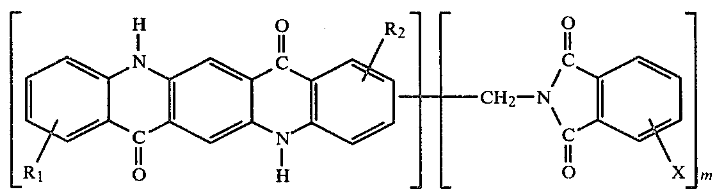

where $R_1$, $R_2$, X and m are defined as above.

For availability and economics o-carboxybenzamidomethyl quinacridone is preferred, i.e., where $R_1$, $R_2$ and X are hydrogen and m is 1. To insure the optimum conversion to the strong γ-quinacridone pigment from 0.3% to 0.5% of the o-carboxybenzamidomethyl quinacridone compound is preferred.

The o-carboxybenzamidomethyl quinacridone compound in the specified amounts can be added to the synthesis system at substantially any time prior to or simultaneously with the addition of the oxidizing agent or during the synthesis of the β-dihydroquinacridone itself. The most convenient and preferred time to introduce the o-carboxybenzamidomethyl quinacridone compound is prior to the addition of the oxidizing agent. The critical criterion is that the o-carboxybenzamidomethyl quinacridone compound be present during the oxidation of the β-dihydroquinacridone.

It has been found that amounts of o-carboxybenzamidomethyl quinacridone compound from 0.1% to 1% by weight, based on the β-dihydroquinacridone, result in the formation of a γ-quinacridone which exhibits strength comparable to the γ-quinacridone which has been subjected to further processing steps to improve its strength. If less than 0.1% by weight of o-carboxybenzamidomethyl quinacridone compound is employed, the resulting γ-quinacridone does not exhibit sufficiently high strength and intensity. When more than 1% of o-carboxybenzamidomethyl quinacridone compound, the oxidation of the β-dihydroquinacridone is inhibited resulting in incomplete conversion of β-dihydroquinacridone to γ-quinacridone. Amounts of o-carboxybenzamidomethyl quinacridone of 3% by weight have been found to stop the oxidation completely. Consequently, for the best combination of conversion and strength amounts of o-carboxybenzamidomethyl quinacridone compound from 0.3% to 0.5% by weight are preferred.

Other than the presence of o-carboxybenzamidomethyl quinacridone during the oxidation of β-dihydroquinacridone, the conditions of the oxidation are substantially the same as those described in U.S. Pat. No. 3,007,930 which is herein incorporated by reference. In addition the source of the β-dihydroquinacridone is not particularly critical to the practice of this invention and substantially any pigmentary quality reasonably pure β-dihydroquinacridone can be utilized. A common method for preparing β-dihydroquinacridone, useful in the subsequent oxidation, is described in U.S. Pat. No. 3,007,930.

A convenient way to prepare the β-dihydroquinacridone, useful in the practice of this invention, is to subject the α-dihydroquinacridone to the action of a relatively strong solution of an alkali such as sodium hydoxide in a mixture of water and an alcohol in order to form its sodium salt. The resulting sodium salt is hydrolyzed by dilution with a relatively large amount of water and samll amount of acid to reduce the alkalinity of the system to some extent, e.g., 1.5% to 2.5% by weight of NaOH, calculated on the basis of the total weight of the slurry yielding β-dihydroquinacridone. This method of preparing the β-dihydroquinacridone is preferred for the practice of this invention because the resulting slurry can be utilized directly in the step of oxidizing the β-dihydroquinacridone to γ-quinacridone.

To oxidize the β-dihydroquinacridone to γ-quinacridone, the β-dihydroquinacridone is suspended in a solution consisting of water, a polar water-soluble liquid, such as a lower alcohol, and an alkali, such as sodium hydroxide. A mild oxidizing agent such as sodium m-nitrobenzene sulfonate is then added to the slurry under reflux to form the bright red γ-quinacridone.

The alkali used in this process is not particularly critical. Because sodium hydroxide is the most readily available of alkalis, and because it is by far the most economical to use, it is the preferred agent. Nevertheless, other alkalis, such as lithium and potassium hydroxide, may be used. In the case of the polar organic liquid utilized in this process, the principal limitation is that the organic liquid must have appreciable solubility in water. Alcohols such as methanol, ethanol, and propyl alcohols are examples of monohydric alcohols which can be utilized. Dihydroxy compounds, such as ethylene glycol, and the mono-ethers of such dihydroxy compounds may also be utilized. Any polar, water-soluble organic liquid stable to the action of strong alkali metal hydroxide solutions may function. The proportion of various ingredients during the oxidation is generally as follows: 100 parts of water, less than 12 parts of alkali, usually 10 to 14 parts, and less than about 189 parts of organic liquid, usually 170 to 200 parts.

The oxidizing agent utilized should be a mild oxidizing agent which is soluble in the reaction medium and sufficiently mild to avoid decomposition of the reaction products. The amount of oxidizing agent required for this process is not at all critical. In general, the optimum ranges between about 0.75 part to 1 part per part of β-dihydroquinacridone but the requirement is largely one of economy rather than successful operation. Obviously, enough agent must be used to complete the oxidation, and this can be readily calculated. Excessive amounts are avoided only for reasons of economy. The examples which follow show the use of sodium m-nitrobenzene sulfonate as the agent for oxidizing β-dihydroquinacridone to γ-quinacridone. Sodium polysulfide is another oxidizing agent which can be used in this process, and it is known that air will result in oxidation of the β-dihydroquinacridone to γ-quinacridone. Of course, any mild oxidizing agents meeting the criteria set forth above could be utilized.

The concentration of β-dihydroquinacridone in the oxidation mixture is not critical and can vary over a wide range. It is preferable to use enough liquid reaction medium to produce an easily stirrable mass, and as a practical matter, one should use at least an amount of liquid which would allow all the solid particles to come in contact with the liquid during a reasonable agitation period. A 10% concentration of β-dihydroquinacridone in the oxidation mixture is a good concentration for practical operation, but it is not a limiting concentration.

BEST MODE—EXAMPLE

In the example which follows, the analytical method used to determine the tinting strength and intensity of the γ-quinacridone tested was conducted according to conventional procedures. A masstone formulation of each γ-quinacridone tested was prepared by mixing 0.6 g of the pigment with 1.2 g of a conventional lithographic varnish, an air-drying resin, according to the procedure described in the Journal of the Oil and Color Chemists Association, No. 396, Vol. XXXVI, June 1953, page 283. The strength of each pigment tested was determined by mixing 0.18 g of the masstone formulation with 10.0 g of a zinc oxide paste prepared by mixing 99 g of the lithographic varnish used to prepare the masstone formulation, 1 g of a typical varnish drier and 150 g of zinc oxide. The relative tinting strength and intensity of the γ-quinacridone tested is determined visually after spreading each of the tinting formulations on white paper.

EXAMPLE 1

To 40 g of α-6,13-dihydroquinacridone was added 158 g of methyl alcohol and 23.9 g of a 50% by weight aqueous solution of sodium hydroxide. The mixture was stirred for 1 hour at 40° to 45° C. Then 7.3 g of 78% by weight aqueous sulfuric acid, 44 g of water and 0.16 g of o-carboxybenzamindomethyl quinacridone were added to the mixture. Stirring was continued and the mixture was refluxed for 1 hour. Then 23.2 g of sodium m-nitrobenzene sulfonate, 6 g of the 50% aqueous sodium hydroxide and 23 g of water were added to effect the oxidation. The mixture was refluxed for 4 hours to form a bright red slurry which was diluted with cold water, filtered, washed and dried to yield 39.6 g of a high strength γ-quinacridone, which was spectrophotometrically analyzed and found to contain 98.5% by weight of quinacridone.

When the above-prepared γ-quinacridone was compared in tinting strength and intensity to a γ-quinacridone prepared in the same manner without the addition of o-carboxybenzamidomethyl quinacridone, the γ-quinacridone prepared above exhibited a 6% greater tinting strength and a substantial improvement in color intensity. The tinting strength and intensity of the above-prepared γ-quinacridone was equal to that of commercially available γ-quinacridones which had been subjected to milling or treatment with organic liquids.

INDUSTRIAL APPLICABILITY

The present invention is particularly advantageous in industrial situations where it is desired to avoid the additional expense and time associated with further treating the γ-quinacridone produced to improve its tinting strength. The γ-quinacridone produced in accordance with this invention can be utilized without after-treatments designed to reduce the particle size and, thus, increase the tinting strength of the product.

I claim:

1. In a process for preparing pigmentary γ-quinacridone by oxidizing β-dihydroquinacridone with a mild alkali-stable oxidizing agent in a liquid medium consisting of alkali metal hydroxide, water and a polar, alkali-stable, water-soluble organic liquid, the improvement comprising conducting the oxidation in the presence of from 0.1% to 1% by weight, based on the weight of the β-dihydroquinacridone, of at least one o-carboxybenzamidomethyl quinacridone compound of the formula:

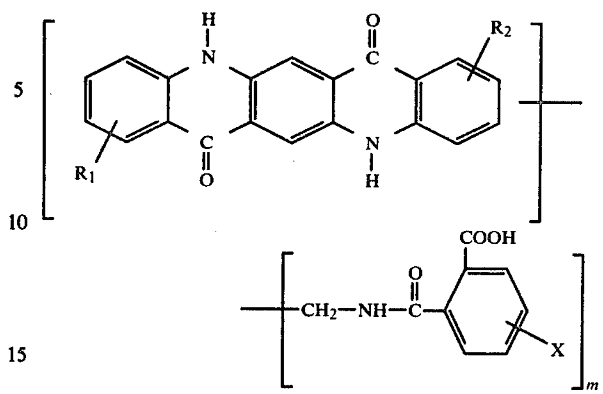

wherein the o-carboxybenzamidomethyl groups are substituted for aromatic hydrogen on the terminal rings, m is an integer from 1 to 4, inclusive, X is selected from the group consisting of hydrogen, fluorine, chlorine, bromine, methyl and methoxy, and $R_1$ and $R_2$ are selected from the group consisting of hydrogen, fluorine, chlorine, bromine, methyl and methoxy.

2. Process according to claim 1 wherein the formula of the compound is substituted such that $R_1$, $R_2$ and X are hydrogen and m is 1.

3. Process according to claim 1 wherein the o-carboxybenzamidomethyl quinacridone is present in an amount from 0.3% to 0.5% by weight, based on the weight of the β-dihydroquinacridone.

4. Process according to claim 2 wherein the oxidizing agent is selected from sodium m-nitrobenzene sulfonate, air and polysulfide.

* * * * *